US008848699B2

(12) United States Patent
Gambardella et al.

(10) Patent No.: US 8,848,699 B2
(45) Date of Patent: Sep. 30, 2014

(54) DEVICES, SYSTEMS, AND METHODS FOR DISTRIBUTED MONITORING AND CONTROL OF NETWORKED SERVER COMPUTERS

(75) Inventors: Matthew Gambardella, Redmond, WA (US); Steven White, Grafton, WV (US); David Kaplin, Fairmont, WV (US)

(73) Assignee: Nebula, Inc., Palo Alto, CA (US)

( * ) Notice: Subject to any disclaimer, the term of this patent is extended or adjusted under 35 U.S.C. 154(b) by 115 days.

(21) Appl. No.: 13/570,080

(22) Filed: Aug. 8, 2012

(65) Prior Publication Data

US 2014/0045368 A1 Feb. 13, 2014

(51) Int. Cl.
*H04L 12/40* (2006.01)

(52) U.S. Cl.
USPC ......................................... 370/364

(58) Field of Classification Search
CPC ....... G06F 12/00; G06F 15/167; G06F 13/42; G06F 13/4282; G01R 31/28; H04L 29/06068
USPC ............. 711/E12.001, 10; 714/724; 709/213; 370/364, 466; 340/501, 517, 635, 340/636.18, 539.22, 539.26, 539.28, 340/539.27, 601, 602
See application file for complete search history.

(56) References Cited

U.S. PATENT DOCUMENTS

| 7,352,289 | B1 | 4/2008 | Harris |
| 2002/0004912 | A1 | 1/2002 | Fung |
| 2002/0026532 | A1 | 2/2002 | Maeda et al. |
| 2003/0088655 | A1 | 5/2003 | Leigh et al. |
| 2003/0191809 | A1* | 10/2003 | Mosley et al. ................ 709/213 |
| 2007/0085678 | A1* | 4/2007 | Joy et al. ................. 340/539.26 |
| 2007/0101173 | A1 | 5/2007 | Fung |
| 2008/0320117 | A1 | 12/2008 | Johnsen et al. |
| 2009/0204742 | A1 | 8/2009 | Wiler |
| 2009/0235104 | A1 | 9/2009 | Fung |
| 2012/0166702 | A1* | 6/2012 | Toba et al. .................... 710/316 |
| 2012/0176941 | A1* | 7/2012 | Bata et al. ..................... 370/255 |
| 2013/0218731 | A1* | 8/2013 | Elson et al. .................... 705/30 |

OTHER PUBLICATIONS

International Search Report from International Application No. PCT/US2013/053987 mailed Feb. 3, 2014.

* cited by examiner

*Primary Examiner* — Charles C Jiang
*Assistant Examiner* — Rose Clark
(74) *Attorney, Agent, or Firm* — Fountainhead Law Group P.C.

(57) ABSTRACT

Embodiments of the present invention include network cables that include a number of inter-integrated circuit communication addressable components in the connector heads. The inter-integrated circuit communication addressable components include signal translators and switches for communicating with environmental and electrical sensors, memories, and controllers in the connector heads and the computers or network interface cards to which they are coupled. Such embodiments allow for localized monitoring of environmental and operational data as well as location or server computer specific control of networked-server operations. Such information and control is useful in reducing the cost and increasing the efficiency of server farm installation cooling, maintenance, operation, and troubleshooting. Other embodiments include methods for communicating between a switch and a server computer using the network cable assembly by translating a signal from a one communication protocol to another for transmission over a dedicated connection between two connector heads.

26 Claims, 8 Drawing Sheets

DEVICES, SYSTEMS, AND METHODS FOR DISTRIBUTED MONITORING AND CONTROL OF NETWORKED SERVER COMPUTERS

BACKGROUND

The present invention relates to the installation, operation, and maintenance of communication and data networks and networked computers at the circuit/mother board level. In particular, embodiments of the present disclosure are directed to devices, systems, and methods for distributed monitoring and control of server computers and other network devices, at the circuit/mother board level.

Unless otherwise indicated herein, the approaches described in this section are not prior art to the claims in this application and are not admitted to be prior art by inclusion in this section.

As cloud computing and other online and software services, software as a service (SaaS), become increasingly more popular and ever more ubiquitous, computing resource providers are faced with the challenges associated with ever-increasing size of server facilities, or so-called "server farms." In addition to the space and power requirements required for operating hundreds, if not thousands, of networked computer servers, computing resource providers must also consider the maintenance, monitoring, and repair of such large deployments of server computers. To address the space and power distribution requirements of such large-scale computer server operations, many computing resource providers use rack mount server computer configurations 100, such as that shown in FIG. 1.

As shown in FIG. 1, rack mount form factor server computers 130 can be installed in a server rack 105. The use of server racks 105 to house and organize rack mount form factor server computers 130 addresses two initial challenges that face operators of large scale server farms. Firstly, by arranging the computer servers vertically, as shown in FIG. 1, the rack mount form factor server computers 130 installed in a rack 105 can reduce the physical footprint required for each server computer, thereby increasing the server computer density per square foot in a server farm facility. Secondly, many server computer racks 105 also include backplane power distribution sockets which allow for rack mount form factor server computers 130 to be physically inserted into the rack 105 and be electrically connected to a power supply simultaneously. Each server computer in the rack can then be connected to one another, and/or to other server computers external to the rack, to form a network of computers.

To create the necessary network connections, each server computer 130 is individually coupled via one or more networking cables to an appropriate network communications device, such as switch, bridge, or router 110, as shown in FIG. 1. Such high density rack mounted configurations 100, some of which can include multiple racks of rack mount form factor computers 130 in a single room, tend to generate large amounts of excess heat that must be managed appropriately to prevent overheating which, if left unchecked, can damage or destroy the server installation.

To manage the excess heat, various systems exist for cooling or otherwise extracting the heat from the server room in which the server racks of server computers are installed. For example, many server farms are equipped with powerful air conditioner systems to flood the server room with cooled and humidity controlled air 115. While effective, such systems usually do not have server-position based feedback to tell the cooling system where more cooling is required and where the cooling can be reduced. As such, conventional server farm cooling systems often run at temperatures lower than required at great expense to the server farm operator. The effectiveness and efficiency of such cooling systems are further reduced by the fact that most cooling system configurations direct the cold air 115 from the bottom end of the server rack 105. This results in an undesirable temperature gradient 120, with cooler temperatures achieved at the bottom 125 of the rack 105 and higher temperatures, due to the waste heat from the server computers 130, at the top 127.

In attempts to reduce the overall operating cost of the server room, some operators may choose to operate the cooling systems at higher temperatures at the risk of potentially overheating some or all of the server computers of the top 127 of rack 105, or another rack which may be operating at higher temperatures than rack 105 due to higher computing activity. Accordingly, a server farm operator using conventional cooling systems must balance the cost savings associated with running the cooling system at higher temperatures with the risk of possibly overheating one or more of the server computers 130 in one or more server racks.

Furthermore, the as the density of server computers 130 in a given server farm installation increases, the task of maintaining, troubleshooting, repairing, and auditing the installation of server computers grows increasingly arduous. Since the motivation to reduce costs typically deters server farm operators from hiring additional technicians, most server farm operators seek to increase the level of automation with which they can efficiently and effectively operate. The ability to detect, locate, diagnosis, troubleshoot, as well as indicate to technicians, server computers that are experiencing unfavorable environmental conditions, such as overheating, or have suffered a software, firmware, or hardware malfunction, can greatly increase the efficiency and effectiveness of each technician tasked with the operating the server farm. Increasing the effectiveness and efficiency of each technician can translate into not only cost savings for the server farm operator, but also increased performance and revenue. While some systems exist for accomplishing such monitoring and maintenance, existing solutions include dedicated computing devices and additional monitoring structures which increase the cost of acquisition and installation, thus negating much of the cost savings that a server farm operator might achieve in the resulting reduced operational costs.

Thus, there is a need for improved systems, devices, and methods for distributed monitoring and control of networked server computers. The present invention solves these and other problems by providing network cables with distributed sensors that can deliver information and control signals amongst a distributed installation of existing server computers and switches using existing communication channels and protocols.

SUMMARY

Embodiments of the present invention improve monitoring, programming, and control of networked computers and other network devices at the circuit/mother board level. One embodiment includes a network cable having a first connector head coupled to a first end of a network cable. The first connector head can include a first signal switch having multiple ports. One of the ports can be coupled to a first connector terminal configured to establish a first connection external to the network cable. The first connector head can also include a first bus internal to the first connector head that can be coupled to a second port of the first signal switch. The first connector head can also include second bus internal to the first connector head coupled to a third port of the first signal switch.

In related embodiments, the network cable can also include a second connector head coupled to a second end of the network cable. The second connector head can include a second signal switch comprising multiple ports. One of the ports of the second signal switch can coupled to a second connector terminal configured to establish a second connection external to the network cable. The second connector head can also include a first bus internal to the second connector head coupled to a second port of the second signal switch. The second connector head can further a second bus internal to the second connector head coupled to a third port of the second signal switch and coupled to the second bus internal to the first connector head via the network cable.

In some embodiments, the first connector head can include a connector terminal configured to couple to a first bus external to the network cable and the second connector terminal head can include a connector terminal that can be configured to couple to a second bus external to the network cable. The first bus external to the network cable can be disposed in a network device and the second bus external to the network cable can be disposed in a server computer.

In related embodiments, the network cable can include a device coupled to the first bus internal to the first connector head. The device can include various elements, components, or functions, such as, a memory or sensor. The network cable can also include multiple devices coupled to the second bus internal to the second connector head. The multiple devices coupled to the second bus internal to the second connector head can include elements, components, or functions, such as memories and sensors.

In other embodiments, the plurality of devices coupled to the second bus internal to the second connector head can include a signal translation module coupled to a dedicated connection in the network cable and configured to generate a modified signal in response to a signal received via the second bus internal of the second connector head and send the modified signal via the dedicated connection to the second bus internal to the first connector.

Another embodiments is directed to a method that can include receiving, from a first device external to a network cable, a command signal at a first terminal of a first connector head coupled to a first end of the network cable and routing the command signal to a first port of a first switch internal to the first connector head, The method also includes routing the command signal from the first switch to a first bus internal to the first connector head or a second bus internal to the first connector head. The second bus internal to the first connector head can be coupled to a bus internal to a second connector head coupled to a second end of the network cable. In such embodiments, routing the command signal can include determining an address information from the command signal and configuring the first switch internal to the first connector head to couple the first terminal of the first connector head to the first bus internal to the first connector head or the second bus internal to first connector in response to the address information. In some embodiments, the second bus internal to the first connector head is coupled to the bus internal to the second connector head via a translation module.

In other embodiments, receiving, from the first device external to the network cable, the command signal at the first terminal of the first connector head, includes receiving the command signal from a first bus internal to the first device. In such embodiments, the first device comprises a server computer, network communication switch, other network device.

Other embodiments are directed toward systems that include a network cable having a first connector head coupled to a first end of a network cable. The first connector head can include a first signal switch having multiple port. One of the ports can be coupled to a first connector terminal configured to establish a first connection external to the network cable. The first connector head can also include a first bus internal to the first connector head coupled to a second port of the first signal switch. The first connector head can also include a second bus internal to the first connector head coupled to a third port of the first signal switch. The network cable can also include a second connector head coupled to a second end of the network cable having a second signal switch having multiple ports. One of the ports can be coupled to a second connector terminal configured to establish a second connection external to the network cable. The second connector head can also include a first bus internal to the second connector head coupled to a second port of the second signal switch. The second connector head can also include a second bus internal to the second connector head coupled to a third port of the second signal switch and coupled to the second bus internal to the first connector head via the network cable, a first network device coupled to the first connector head, and a second network device coupled to the second connector head.

In related embodiments, the second bus internal to the first connector head can be coupled to the second bus internal to the second connector head via the network cable and via a first translation module internal to the first connector and a second translation module internal to the second connector head.

In other embodiments, the system includes a network cable having a dedicated communication connection coupled to the second bus internal to the first connector head and the second bus internal to the second connector head. The second connector head can further include a first device coupled to the second bus internal to the second connector head. The first device coupled to the second bus internal to the second connector head can include a sensor, such an environmental or electrical sensor.

Some other embodiments are directed toward methods that include receiving, at a first connector terminal of a first connector head of a network cable, a command signal in a first communication protocol from an external device, the first connector head includes a first internal switch coupled to each of the first connector terminal, a first bus internal to the first connector head, and a second connector head of the network cable. The switch, or other logic, can selectively route the command signal in the first communication protocol from the first connector terminal to one of the first bus internal to the first connector head or the second connector head. Routing the command signal to the second connector head can include routing the command signal to a second bus internal to the first connector head coupled to a third bus internal to the second connector head via a dedicated connection in the network cable.

In other embodiments, routing the command signal to the third bus internal to the second connector head can further include routing the command signal to a first device coupled to the third bus internal to the second connector head. The internal device coupled to the third bus internal to the second connector head can include a sensor. Such a sensor can include a temperature, humidity, or other environmental sensor.

In related method embodiments, routing the command signal to the third bus internal to the second connector head can include converting the command signal from the first communication protocol to a second communication protocol, sending the command signal in the second communication protocol to the second connector head via the dedicated connection, receiving the command signal in the second communication protocol at the second connector head, converting the command signal from second communication protocol to the first communication protocol, and routing the command signal in the first communication protocol to a device coupled to the third bus internal to the second connector head.

In yet other embodiments, such methods can also include routing, in response to the command signal, a response signal from a device coupled to the third bus internal to the second connector head to the first connector head via the dedicated connection in the network cable. The device coupled to the third bus internal to the second connector head can include an environmental sensor and the response signal can include environmental data from the environmental sensor.

In other embodiments, routing the response signal to the first connector head can further include converting the response signal from the first communication protocol to the second communication protocol, sending the response signal in the second communication protocol to the first connector head via the dedicated connection, receiving the response signal in the second communication protocol at the first connector head, converting the response signal from the second communication protocol to the first communication protocol, and routing the response signal in the first communication protocol to the external device via the first internal switch in the first connector head.

The following detailed description and accompanying drawings provide a better understanding of the nature and advantages of the present invention.

DETAILED DESCRIPTION

Described herein are techniques for devices, systems, and methods for distributed monitoring and control of server computers and other network devices at the circuit/motherboard level. In the following description, for purposes of explanation, numerous examples and specific details are set forth in order to provide a thorough understanding of the present invention. It will be evident, however, to one skilled in the art that the present invention as defined by the claims may include some or all of the features in these examples alone or in combination with other features described below, and may further include modifications and equivalents of the features and concepts described herein.

Various embodiments of the present invention are directed towards enhanced computer networking communication cable assemblies with distributed sensors, memories, and controllers for remotely monitoring and controlling existing networked server computers. According to such embodiments, each enhanced computer networking communication cable assembly can include connector heads that include the terminals and connectors for enabling communication between a switch or router and a networked server computer, as well as I2C, SMBus, or other low-voltage or short distance inter-integrated circuit communication protocol enabled devices capable of addressing sensors, memories, and control modules on a dedicated bus. Such enhanced computer networking communication cables in conjunction with appropriately upgraded or programmed switches and/or routers, can communicate with sensors, memories, and controllers in the connector heads as well as sensors, memories, and controllers attached to an inter-integrated circuit communication protocol communication network or bus internal or local to each server computer or network device. In such embodiments, the low-voltage or short distance inter-integrated circuit communication protocol bus local to or internal to each connector head can also be configured to couple to or route signals to and from a connector terminal in the connector head to establish connections with one or more buses external to the connector head.

Such cable and system architectures deployed in server farm environments increase the capabilities of the server farm operator or computing resource provider for monitoring various environmental conditions, such as temperature and humidity, as well as providing for enhanced or new capabilities with regard to maintenance and operation of the server computers, such as fan control, power/reboot control, and other motherboard level operations previously only available to each server computer or a devices that are directly connected to the server computers' inter-integrated circuit communication or programming interface.

Figure 1:
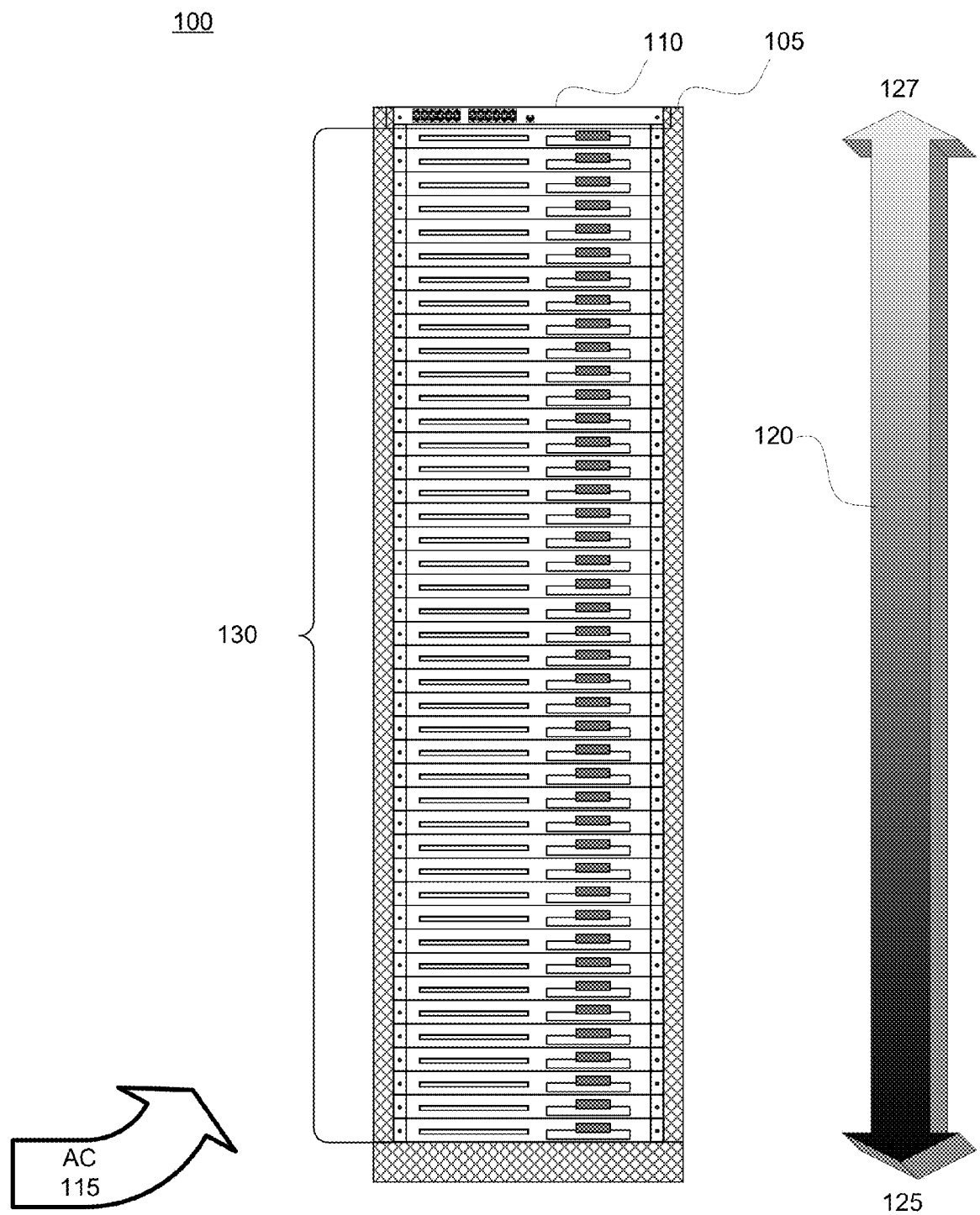
FIG. 1 illustrates a rack of rack mount form factor server computers that can be improved by various embodiments of the present.
Figure 2:
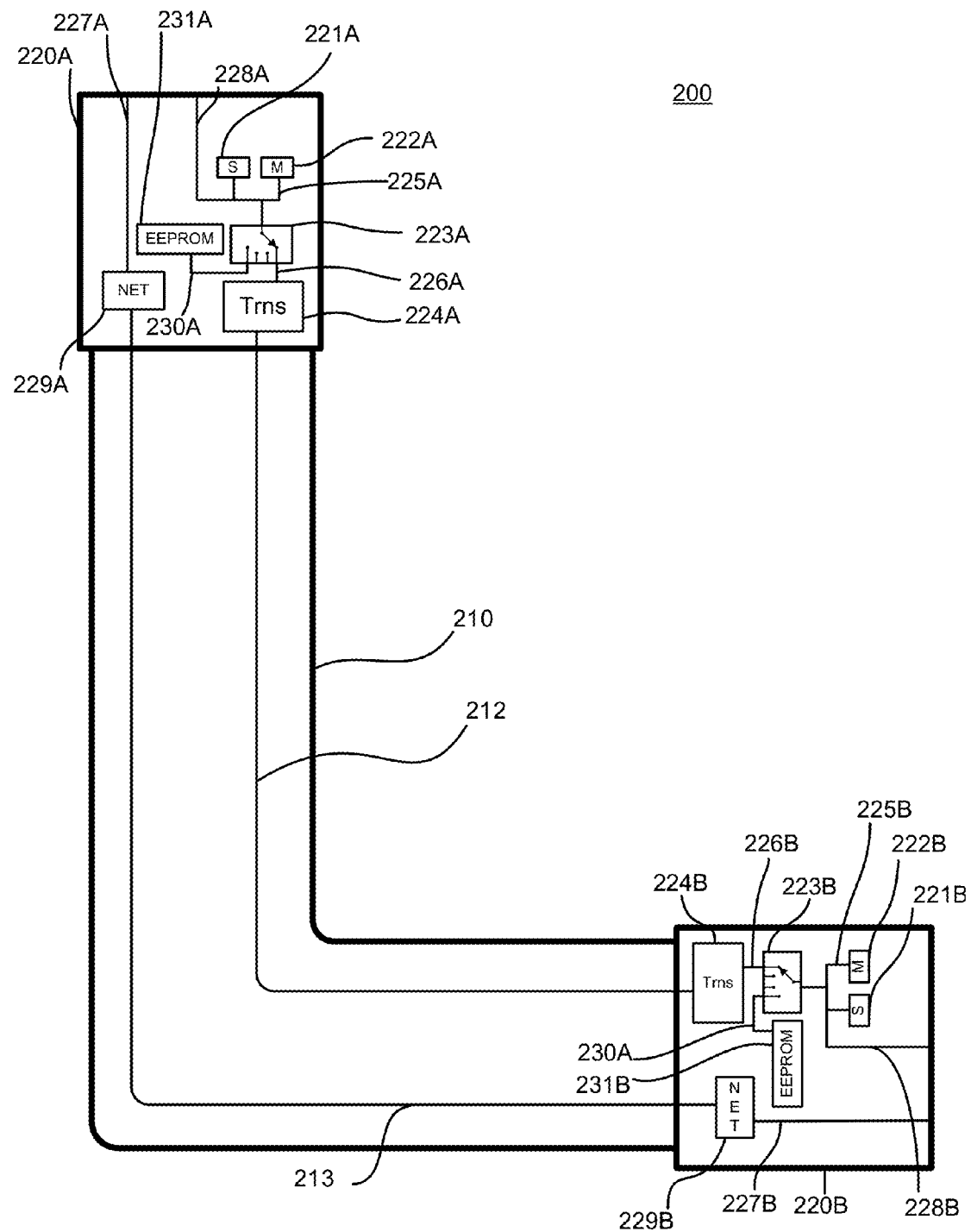
FIG. 2 illustrates a network cable assembly according to various embodiments of the present invention.

Embodiments of the present invention include network cable assembly 200 shown in FIG. 2. As shown, the network cable assembly 200 can include a first connector head 220A and a second connector head 220B. Connector heads 220A and 220B can be connected to one another via a network cable bundle 210. In deployment, the first connector head 220A can be coupled to a network communication switch and connector head 220B can be coupled to a server computer, thus coupling the switch to the server computer.

Cable bundle 210 can include multiple communication wires, such as network communication wires 213, and inter-integrated circuit communication wires 212. The network communication wires 213 can include various types of conventional communication wires, such as CAT5 twisted pairs and coaxial cable, for communication over Ethernet or other similar networking protocols. The cable bundle 210 can also include fiber-optic bundles for communication over various optical network communication protocols. The inter-integrated circuit communication wires 213 can include one or more twisted pairs of metal wires for low bandwidth communication over various types of inter-integrated circuit communication protocols, such as I2C and SMBus. While FIG. 2 only shows exemplary numbers of network communication wires 213 and inter-integrated circuit communication wires 212, various embodiments the present invention also include larger numbers of such wires.

Network communication cable assembly 200 can include connector heads 220A and 220B having components that are coupled to the corresponding communication wires within the cable bundle 210. In some embodiments of the present invention, network communication wires 213 can connect and/or couple the network communication modules or integrated circuits 229A and 229B. The communication modules or integrated circuits 229A and 229B can include filters, signal conditioners, signal boosters, and other components for increasing the speed or the reliability of network communications. The connector heads 220A and 220B can also include network terminals or connections 227A and 227B for coupling to the networked devices, such as switches, routers, and computers.

The inter-integrated circuit communication wires 212 can each include or be a part of a twisted pair of metal wires for communication between and/or connecting signal translation modules 224A and 224B. In some embodiments, inter-integrated circuit communication wires 212 can use any type of twisted pair or other types of conductors that can be used as open-drain lines. For example, inter-integrated circuit communication wires 212 can be a set of unused twisted pairs often available in existing CAT5 cables. Alternatively, the cable bundle 210 can be specially fabricated to include one or more dedicated inter-integrated circuit communication wires 212 specifically for use in I2C or other inter-integrated circuit communication.

Typical voltages used in I2C and other similar inter-integrated circuit communication signals are in the +3.3V to +5V range and are typically intended for use in relatively short distance communications, such as between various boards and integrated circuits coupled to a single common circuit board. Since such relatively low voltage signals can be corrupted by noise or other interference experienced in longer distance communication attempted along the lengths typical of most networking communication cables, various embodiments of the present invention include signal translation modules 224A and 224B in the connector heads 220A and 220B. Signal translation modules 224A and 224B can perform a two-way translation between the relatively low voltage native inter-integrated circuit communication signal, i.e. voltages in the +3.3 V to +5 V range, to a higher signal voltage, i.e. voltages in +10 V to +15 V range, to improve the reliability of the transmitted inter-integrated circuit communication signal. In related embodiments, signal translation modules 224A and 224B can also up-convert and down-convert the current at which the inter-integrated circuit communication signals are sent between connector heads 220A and 220B. In some other embodiments, the signal translation modules 224A and 224B can be or be included in an integrated circuit.

When inter-integrated circuit communication signals are received in either of signal translation modules 224A or 224B in an increased-voltage or increased-current signal format, the signal translation module can convert the received signal into a native inter-integrated circuit communication protocol or signal voltage or current level. Such inter-integrated circuit communication protocols can include I2C or SMbus protocols. As used herein, the terms inter-integrated circuit communication protocol, I2C or SMbus protocols can be used interchangeably to refer to any short to mid distance or low to medium bandwidth communication protocol used to read from, write to, or otherwise interact with or alter electrically coupled electronic components, such as sensors, memories, and integrated circuits on an inter-integrated circuit communication protocol bus.

The down-converted or translated inter-integrated circuit communication signal can then be routed to an inter-integrated circuit communication switch, such as switch 223A or 223B over communication lines 226A and 226B in the connector heads 220A and 220B. The communications lines 226A and 226B can include wires or traces on a printed circuit board (PCB).

In various embodiments, the inter-integrated circuit communication switches can be controlled in a number of ways to route received signals to the intended device. In one embodiment, inter-integrated circuit communication switches 223A and 223B can access or otherwise interpret the address bits of the inter-integrated circuit communication signal to route the signal to the appropriate component in the connector head or in server computer or network interface card to which the connector head is coupled. In some embodiments, the inter-integrated circuit communication switches 223A and 223B can interpret the address bit in the received and translated signals from both directions. The address bits of the inter-integrated circuit communication signal can include manufacturer specific address bits, device specific address bits, as well location specific address bits, such that the inter-integrated circuit communication switches 223A or 223B can route inter-integrated circuit communication signal to the appropriate bus or device in either one of the connector heads 220A or 220B as well as any inter-integrated circuit communication capable device with a valid inter-integrated circuit communication address in any device coupled to connections 225A or 225B and/or switches 223A or 223B.

In other embodiments, the inter-integrated circuit communication switches 223A and 223B can accept control or routing commands from only one direction. For example, in some embodiments, the inter-integrated circuit communication switches can accept control signals from the connector head terminal side only, i.e. from 228A or 228B and not from 226A and 226B. In such embodiments, the network communication switch or server computer to which the connector head is coupled must send a control signal to the inter-integrated circuit communication switch to configure the switch to be coupled to the local bus in the connector head, i.e. 230A and 230B, or to bus 225A or 225B. In other embodiments, the inter-integrated circuit communication switches can accept control signal from the cable or translation module side only, i.e. from 226A and 226B and not from 228A or 228B.

In yet other embodiments, inter-integrated circuit communication switch 223A can accept control signals from either the cable side, i.e. 226A, or the connector side, i.e. 228A, and inter-integrated circuit communication switch 223B can accept control signals in a reverse configuration. In such embodiments, inter-integrated circuit communication switch 223B can receive control signals from the cable side connection, i.e. 226B, when the inter-integrated circuit communication switch 223A can receive control signal from the connector side connection, i.e. 228A, and inter-integrated circuit communication switch 223B can accept control signal from the connector side connection, i.e. 228B, when the inter-integrated circuit communication switch 223A is configured to accept control signal from the cable side connection, i.e. 226A. In such configurations, it is advantageous to include a second inter-integrated circuit communication switch configured in either connector head configured in the opposite control signal acceptance configuration so that control signals can be routed to the accepting side of the inter-integrated circuit communication switches from a device coupled to the opposite side of the network cable assembly.

In various embodiments, connector head 220A and 220B can include modules 222A and 222B coupled to switches 223A or 223B via bus 225A or 225B, as shown in FIG. 2. Modules 222A and 222B can include any number and variety of environmental, location, or electrical sensors, controllers, and memories. For example modules 222A and 222B can include temperature sensors, such as thermocouples, humidity sensors, EEPROMs, GPS sensors, proximity sensors, volt meters, resistance meters, current meters. All of such sensors can be included in a single integrated circuit, or be connected to a common PCB located in either one or both connector heads 220A or 220B. In some embodiments, more or fewer sensors can be included in one or the other of connector heads 220A or 220B.

For example, connector head 220B can be the end of the network cable assembly 200 that is connected to a server computer. In such configurations, is advantageous for connector head 220B to include an EEPROM having information regarding the location of connector head 220B within the server rack or any information regarding the server computer to which it is coupled, such as a MAC address or rack location. With information regarding the rack location or address stored on a memory in the server-side connector head, various functions, such as business and regulation related audits, can be performed much more quickly and accurately. In such scenarios, an audit of the physical server computer can be performed with reference to a physical rack location stored on the server-side connector head memory. Additionally, with connector head 220B connected to a server computer, in some embodiments it is advantageous for module 222B to include a thermocouple and/or humidity sensor, such that a user who has access to administrative or other functionality of the networking switch to which connector head 220A is connected can retrieve temperature, humidity, and/or other environmental data from the sensors within connector head 220B regarding the vicinity of connector head 220B and/or the server to which it is coupled.

Sensors in connector head 220B can provide localized environmental information that a networking switch, control computer, administrator, or other user can reference for fine tuning environmental controls for the room or rack in which a server computer is located. For example, a sensor in connector head 220B can be accessed periodically to provide real-time, or near real-time, environmental data that can be used to fine tune and/or redirect heating ventilation and air conditioning (HVAC) systems to maintain optimal operating temperatures, thus increasing the effectiveness and reducing costs associated with running the HVAC system. Specifically, if a temperature and/or humidity sensor in module 222B senses that the temperature at connector head 220B or the server to which it is coupled is at or below a threshold temperature or humidity which a server farm operator or computing resources provider has determined is optimal, such information can be sent to an HVAC control module to either reduce the level of cooling, reduce the flow of the cooled air, or increase the humidity at that specific location associated with connector head 220B or the server to which it is coupled. In such embodiments, the cost of running the HVAC system can be reduced by analyzing the sensor data to determine if the level of cooling, air speed, or humidity levels, or other operating conditions can be reduced, altered or otherwise optimized.

Additionally, the effectiveness of the HVAC system can be increased by analyzing the sensor data to determine where the cooled and/or humidified air is most needed, thus providing a computing resource provider or server farm operator the data necessary to alter the operation of the HVAC system to direct lower temperature air and/or increase air flow.

Figure 3:
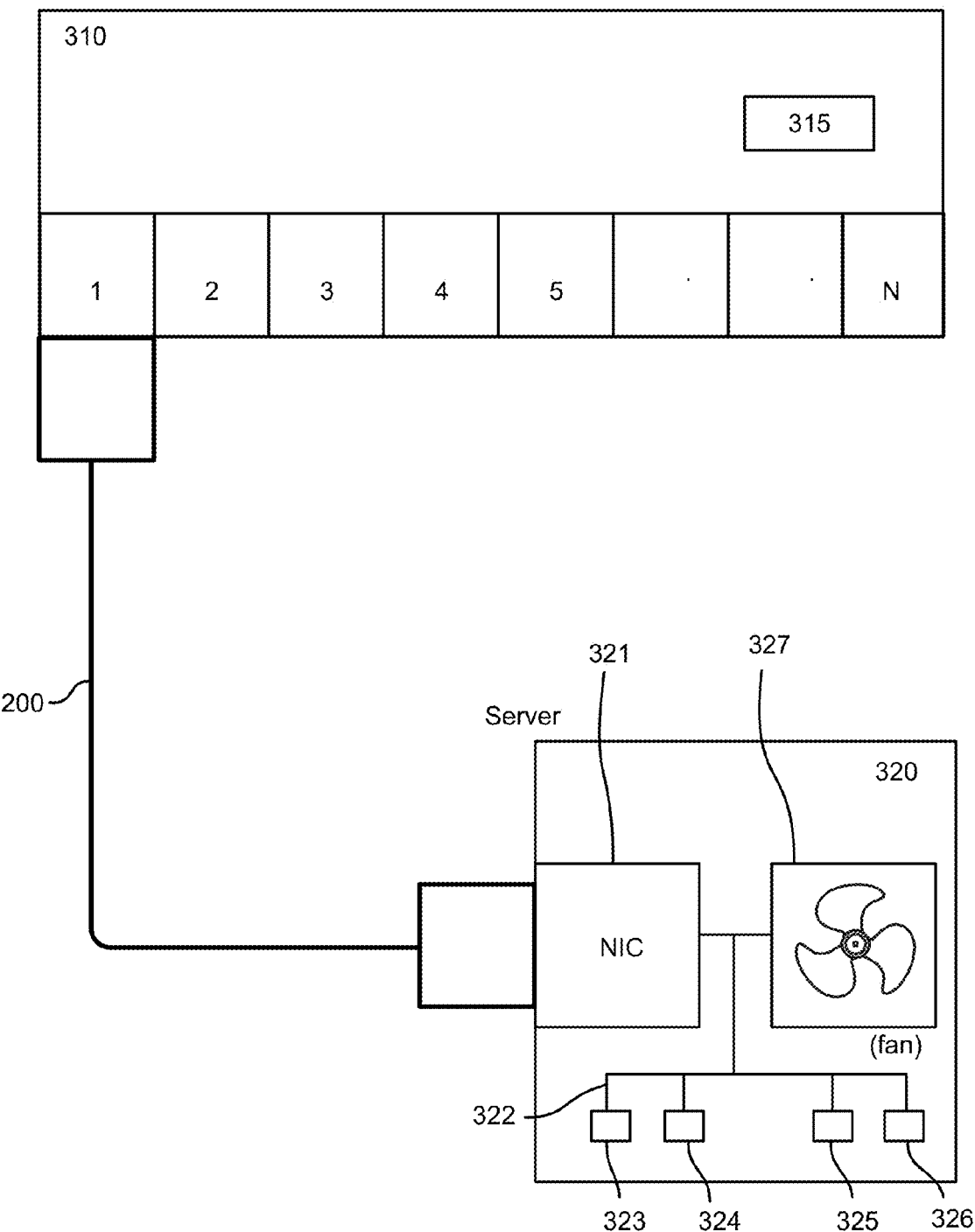
FIG. 3 illustrates a computer coupled to a network switch via network cable according to an embodiment of the present invention.

FIG. 3 shows an exemplary deployment 300 of the network cable assembly 200 for connecting a network switch 310 with server 320. As shown, switch 310 can include network connections or sockets configured to be connected to or coupled with the network cable assembly 200. The end of the network cable assembly 200 having the connector head coupled to the switch 310, is referred to herein as the switch-end connector head. Similarly the connector head at the end of the network cable assembly 200 which is attached to or coupled with server computer 320, is referred to herein as the server-end connector head. As shown, the switch-end connector head of network cable assembly 200 can be coupled to port 1 of switch 310 while the server-end connector head can be coupled to the network interface card (NIC) 321 of server 320. In such configurations, switch 310 can include a non-transitory or non-volatile memory 315 for storing configuration information and settings for switch 310 to address inter-integrated circuit communication addressable components in the switch-end connector head. The configuration information and settings data stored in the memory 315 can be in the form of computer readable code or instructions, such as executable code, software, or firmware.

The data stored in memory 315 can also include configuration information and settings to enable switch 310 to address inter-integrated circuit communication enabled or addressable components in the server via the inter-integrated circuit communication switches and signal translation modules in the switch-end and server-end connector heads that are connected by the inter-integrated circuit communication wires. Through the network cable assembly 200, a user or a remote computer can send command or instruction signals to the switch 310 by a number of networking communication protocols to instruct the switch 310 to send instructions and/or issue requests or command signals to various inter-integrated circuit communication components within server 320 or in the server-end connector head.

For example, switch 310 can issue a read command signal to any one of inter-integrated circuit communication enabled or addressable modules 323, 324, 325, or 326 by inter-integrated circuit communication wires 322 coupled to the network interface card 321. In such a configuration, the remote user or a remote computer can receive environmental information from sensors inside server 320. Similarly switch 310 can also issue commands in response to information received from the modules 323, 324, 225, or 326 to alter the functionality of server 320. For example, switch 310 can issue an on/off command or speed control command using inter-integrated circuit communication protocols sent via network cable assembly 200 to fan 327 in response to the analysis of information received from one or more the sensors inside server 320 or another neighboring computer server. In other embodiments, switch 310 can issue an on/off command to the power supply or power supply control module within server 320 to either shut-down, start-up, or re-boot the server 320. In related embodiments, a server or a network interface card in a server computer can include a control and access module that can include security, translation, and information or functionality for providing or facilitating access to and control of various components connected to the control and access module on a bus internal to the server computer. Such capability can greatly increase the effectiveness of a computing resource provider or server farm technician in the day-to-day operation, maintenance, troubleshooting, and repair of a particular server deployed in a server farm environment by reducing the number of physical visits the technician would need to make to one or more malfunctioning server computers.

Figure 4:
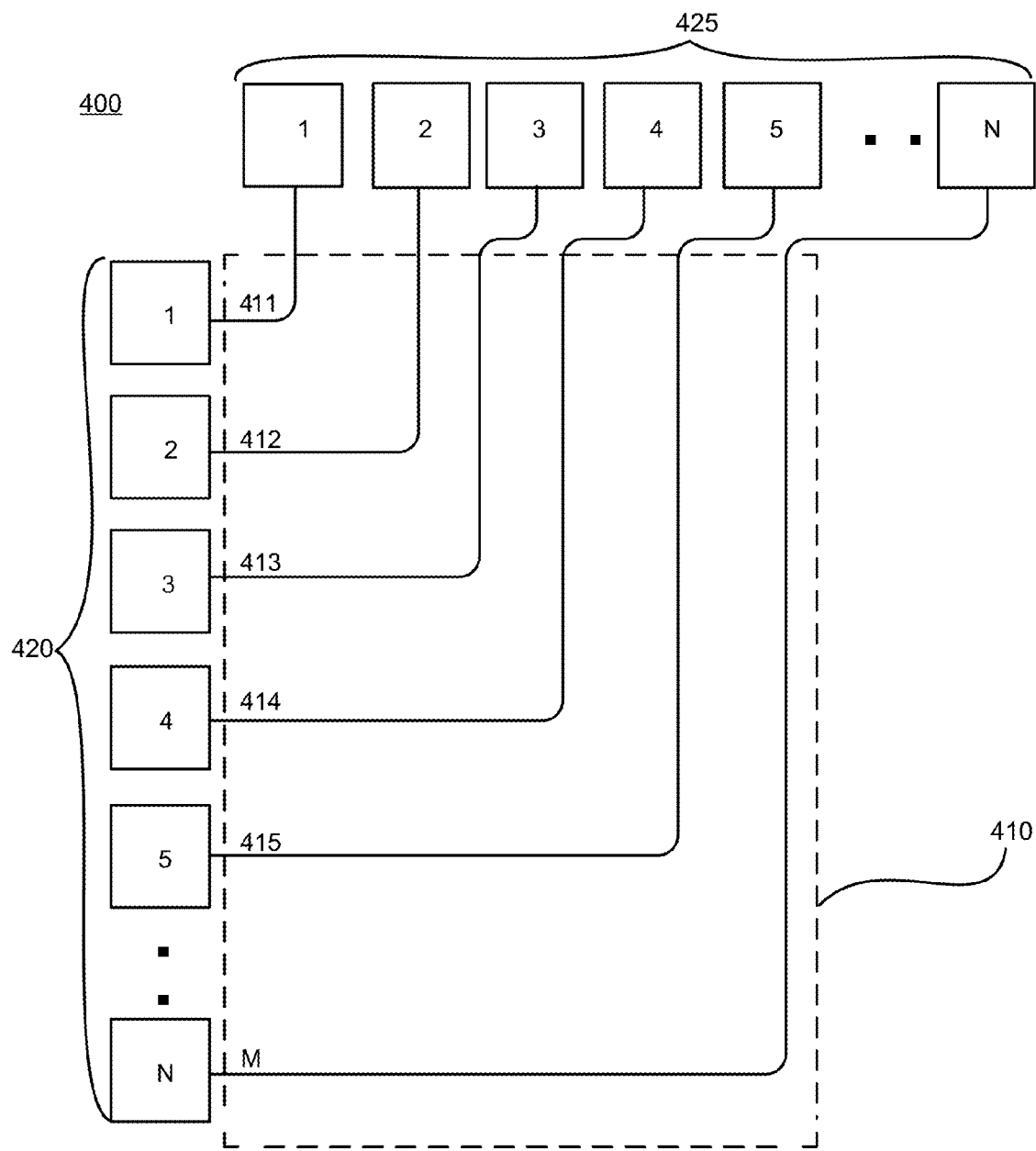
FIG. 4 illustrates a network cable assembly according to an embodiment of the present invention.

In related embodiments, multiple network cable assemblies 200 can be assembled into a composite cable assembly 400 that includes multiple connector heads 220A and 220B coupled via multiple cable bundles similar to cable bundle 210. A simplified schematic of one such embodiment is shown in FIG. 4. As shown, multiple network cable assemblies, including N connector heads 425 and N connector heads 420 connected together in pairs by multiple cable bundles 411, 412, 413, 414, 415 to cable bundle M that can be combined into a single composite cable bundle 410. In such embodiments, N and M are natural numbers that may or may not be equal to one another.

The cable bundles 411, 412, 413, 414, 415 all the way to cable bundle M can all be configured just as or similarly to cable bundle 210 shown in FIG. 2. Accordingly, each cable bundle 411, 412, 413, 414, 415, to cable bundle M can each include a network communication protocol wire or connection as well as inter-integrated circuit communication wires or connections, as previously discussed. The length of each cable bundle 411, 412, 413, 414, 415 to cable bundle M within composite cable bundle 410 can be dimensioned such that when the composite cable assembly 400 is attached to a network communication switch in one location in a server rack, such as at the top of the rack, each of the constituent cable assemblies will reach a specific server location or slot in the server rack.

Figure 5:
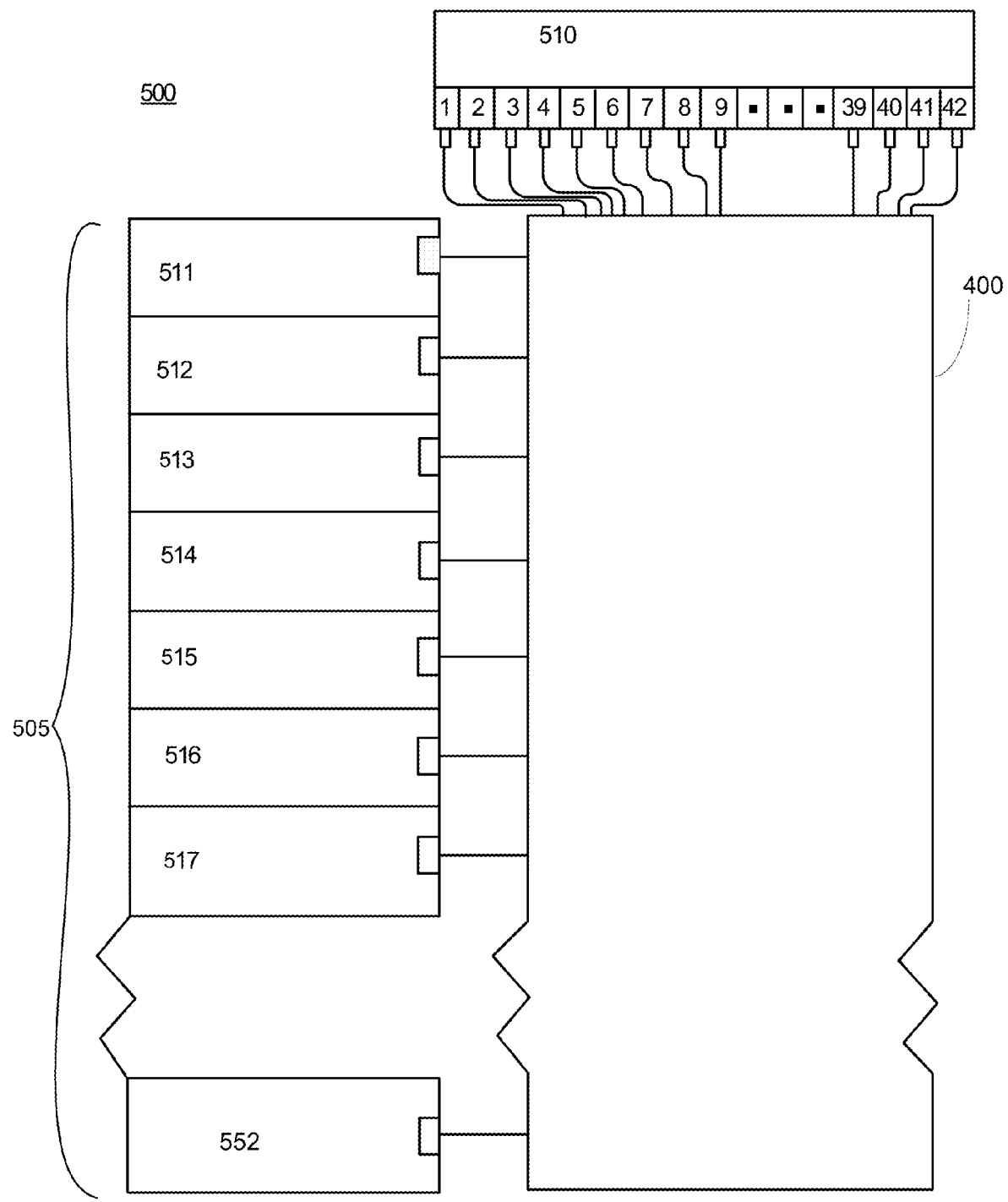
FIG. 5 illustrates a server computer installation that includes a network cable assembly according to an embodiment of the present invention.

For example, FIG. 5 shows that when the switch-end connector head of the first constituent cable assembly within the composite cable assembly is coupled to the network communication switch 510 at port 1, that constituent cable bundle will run to a specific location in the server stack 510, such that the server-end connector head can only reach or be coupled to the server 511. In this particular case, the first constituent cable assembly can be dimensioned such that it will only run from port 1 of the network communication switch 510 to server slot or server computer 511. Similarly, the constituent cable assembly coupled to port 2 of network communication switch 510 will reach server slot or server computer 512. The cable bundle assembly 400 can include as many connector heads on the switch-end as the network communication switch 510 has ports. In the example shown in FIG. 5, network communication switch 510 includes at least 42 ports to service a typical 42 unit high server rack that can accommodate server computers 511 to 542.

In such embodiments, the switch-end connector heads can be assembled into a single connector that will match with the number and spacing of the port connections on network communication switch 510. Each one of the connector heads on the switch-end of the composite cable bundle assembly 400 can include a memory, such as an EEPROM, that can be read from and or written to in order to identify the port number on the network communication switch 510 to which the connector head is coupled. Similarly, the server-end connector heads, can be coupled to backplane connectors of the server rack or to the server computers 511 to 542, and can each include a memory, such as an EEPROM, that includes location information that can be written to or read from to determine the location of that particular connector head, and/or the server computer to which it coupled, in the server rack.

For example the cable bundle assembly coupled to the server slot or server computer at 511 can include information indicating that cable bundle assembly is routed to the topmost slot in the server rack. In such embodiments, a computing resource provider or server farm operator can issue commands over a network to network communication switch 510 to send and I2C communication protocol command and request signals through each one of the constituent cable bundle assemblies to read, write, or activate various operations in the connector head or server computer at a specific slot location. Specifically, data from environmental sensors, such as temperature and humidity sensors, can be read at a specific server slot location or from within the server computer at that server slot location using I2C communication protocols and addressing. Such location specific environmental information can be used to optimize or fine tune the HVAC and humidity control systems in the server farm environment.

The predetermined layout of the system 500 shown in FIG. 5 can also preclude technician error when connecting the composite cable bundle assembly 400 to the network communication switch and the ordered server slots in the server rack 505. Each switch-end connector head of the constituent cable bundle assemblies can be configured within the composite cable bundle assembly 400 such that it can only be coupled to the corresponding ordered port in network communication switch 510. The length of the constituent cable bundles coupled to the order switch-end connector heads will dictate the location within the server rack 505 to which the server-end connector heads can be coupled.

Figure 6:
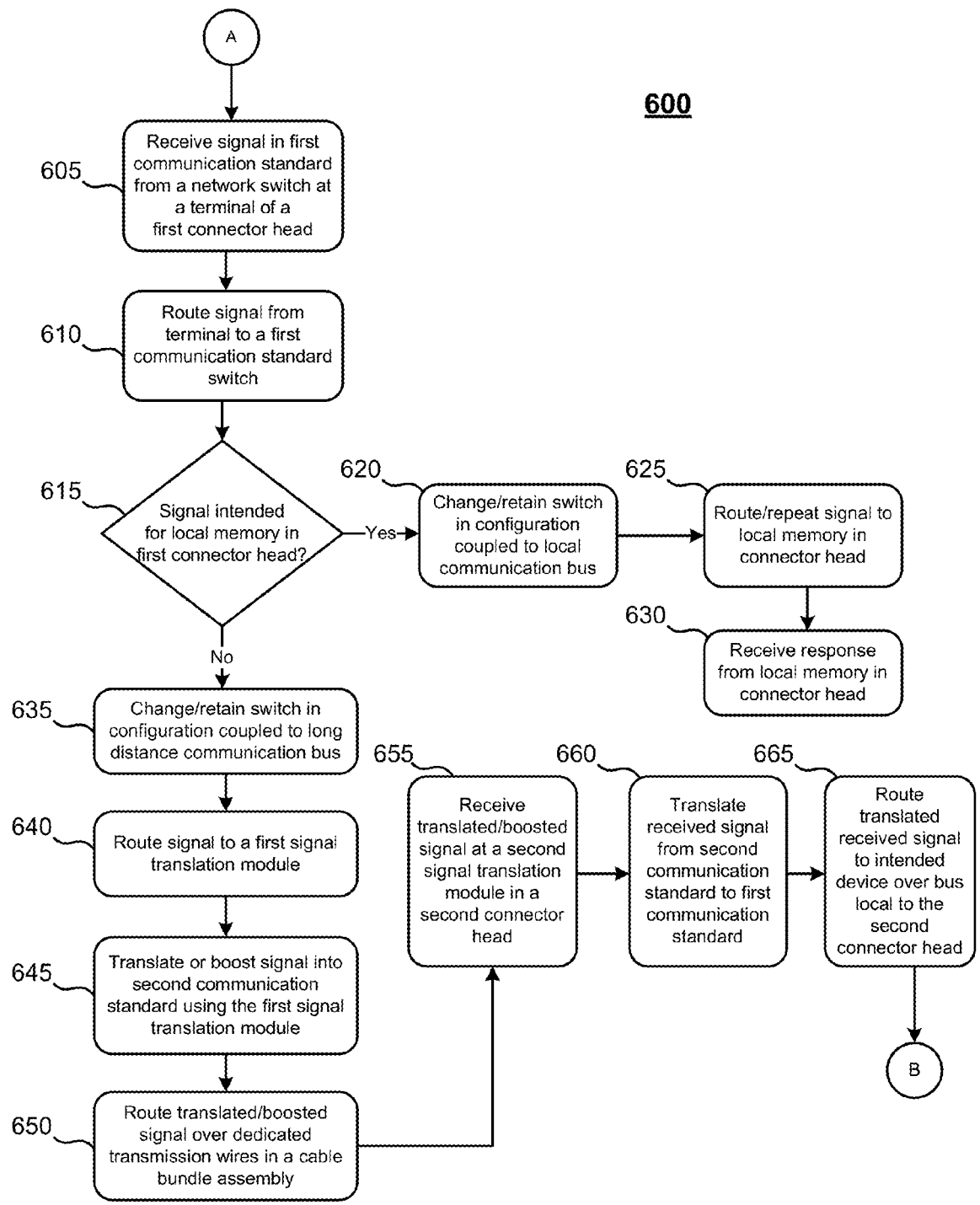
FIG. 6 is a flowchart of a method according to an embodiment of the present invention.

For a network communication switch to issue command signals and receive response signal an inter-integrated circuit communication enabled device in a connector head or in a server computer to which the cable bundle assembly is coupled, the components of the connector heads can be configured to provide the switch with access to each inter-integrated circuit communication enabled device on either end of the cable bundle assembly as if it were directly connected to the inter-integrated circuit communication enabled device bus in the switch. FIG. 6 is a flowchart of a method 600 according to various embodiments the present invention for communicating with inter-integrated circuit communication enabled devices using various embodiments of the present invention.

The method 600 can be used with a cable bundle assembly, such as composite cable bundle assembly 400 and others discussed herein, that can be configured such that a first connector head of the composite cable bundle assembly is coupled to a network communication switch, hub, bridge or other network communication device, while a second connector head of the composite cable bundle assembly is coupled to a server computer or other computing device. For the sake of clarity, the first connector head of the composite cable bundle assembly will be referred to as the switch-end connector head, while the second connector head of the composite cable bundle assembly will be referred to as the server-end connector head.

Once the composite cable bundle assembly is configured with the switch-end connector head coupled to a switch or other device and the server-end connector head is coupled to a server computer via an internal or external network interface card (NIC), the switch-end connector head can receive a signal in a first communication standard from a network switch in action 605. Such signals can include digital control signals in a short distance, low voltage inter-integrated circuit communication protocol, such as I2C, that can be received on one or more of the terminals of the connector head. In such embodiments, the signal can include various I2C protocols and data structures, as well as I2C variants, for encoding addresses, commands, data, responses and other flags and indicators.

Using an electrical connection, such as a wire or a printed circuit board trace, the received inter-integrated circuit communication protocol signal can be routed from the terminal of the switch-end connector head to a first communication standard switch of the switch-end connector head, such as an I2C switch circuit or integrated circuit in action 610. At this point the signal is still in its native short distance or low voltage communication protocol, such as I2C, in which the signal was originally received from the network communication switch. In such embodiments, the network communication switch can be configured to send and receive inter-integrated circuit communication protocol signals on one or more terminals of the switch-end connector head.

At action 615, the switch-end connector head, using the first communication standard switch or other internal logic, can determine whether or not the signal is intended for a local memory, such as an EEPROM, or other device in the first connector head. If the signal is intended for the local memory in the switch-end connector head, then the first communication standard switch in the switch-end connector head can change or retain its configuration such that it couples a local communication bus within the switch-end connector head to the terminal which received the signal, in action 620. With the first communication standard switch in the switch-end connector head configured to couple the pin or terminal of the connector head that received the inter-integrated circuit communication signal, the first communication standard switch can then route, or in some cases repeat, the inter-integrated circuit communication signal to the local memory or other device in the switch-end connector head according to the address bits of the received signal, in step 625.

In some embodiments, a signal from the network communication switch can include a request for identification information or identifier from the local memory in the switch-end connector head. In such embodiments, the inter-integrated circuit communication switch or other internal logic in the switch-end connector head can receive a response from the local memory in action 630. In this way, the network communication switch can receive information from the local memory in the switch-end connector head to determine information associated with a specific cable bundle assembly. Information stored in the switch-end connector head memory can include information regarding manufacturer identity, composite cable bundle assembly type and identifiers, i.e. serial number, available controls and commands, the availability of switch-end connector head sensors, communication devices, logic circuits, and other switch-end connector head capabilities.

If, however, at action 615, the switch-end connector head, using the first communication standard switch or other internal logic, determines that the signal is not intended for a memory or other device in the switch-end connector head, then in action 635, the first communication standard switch in the switch-end connector head can be configured so it is coupled to a long distance communication bus that includes a signal translation module. Such a long-distance communication bus can include one or more dedicated wires, as shown in the network cable assembly 200. The received signal can then be routed via the first communication standard switch in the switch-end connector head to a translation module in the switch-end connector head in action 640.

In action 645, the translation module in the switch-end connector head can then translate or boost the received signal into a second communication standard. In some embodiments, transmitting, or boosting the received signal into a second communication standard can include increasing the voltage and/or electrical current levels of a digital or analog received signal. Increasing the voltage and or current levels of the received signal for transmission over one or more dedicated wires in the cable bundle assembly advantageously assists in transmitting the content of the received signals over the length of the cable bundle assembly while avoiding signal degradation or interference from noise emanating from other wires within the cable bundle assembly and the surrounding environment in which it is deployed. For example, the voltage of the received signal can be increased from 1.5 V to 3.5 V to approximately 10 V to 15 V.

Once the received signal is translated and/or boosted, the translated or boosted signal can be transmitted or routed over the dedicated transmission wires in the cable bundle assembly in action 650. Transmitting the boosted signal over dedicated set of wires in the cable bundle assembly advantageously provides for secure communication between the network communication switch that sent the received signals and the inter-integrated circuit communication addressable components in the connector heads and the server computer to which the server-end connector head of the cable bundle assembly is coupled.

In action 655, the translated and/or boosted signal from the translation module in the switch-end connector head can then be received by translation module in the server-end connector head via the dedicated communication wires in the cable bundle assembly coupled to each connector head. The translation module in the server-end connector head can then translate the received boosted signal from the second communication standard back into the first communication standard in which the signal was originally received from the network communication switch, in action 660.

At 665, the translated received signal can then be routed to the intended device over the inter-integrated circuit communication standard bus local to the server-end connector head. Routing the translated received signal to the intended device can include decoding the address bits from an I2C signal by the first communication standard switch in the server-end connector head or by each of the I2C enabled devices on the bus. The ability to route the transmitted signal to the intended device over the local bus at the server-end connector head can include configuring the first communication standard switch in the server-end connector head to be in a default state such that the signal translation module in the server-end connector head is coupled to the bus.

Implementing method 600 using embodiments of cable bundle assemblies and composite cable bundle assemblies described herein can include upgrading the firmware or otherwise reprogramming the operational software used to run existing network communication switches that implements SMbus type connector heads or other similar connector heads that include one or more terminals or pins for communicating with and inter-integrated circuit communication standard, such as I2C.

Figure 7:
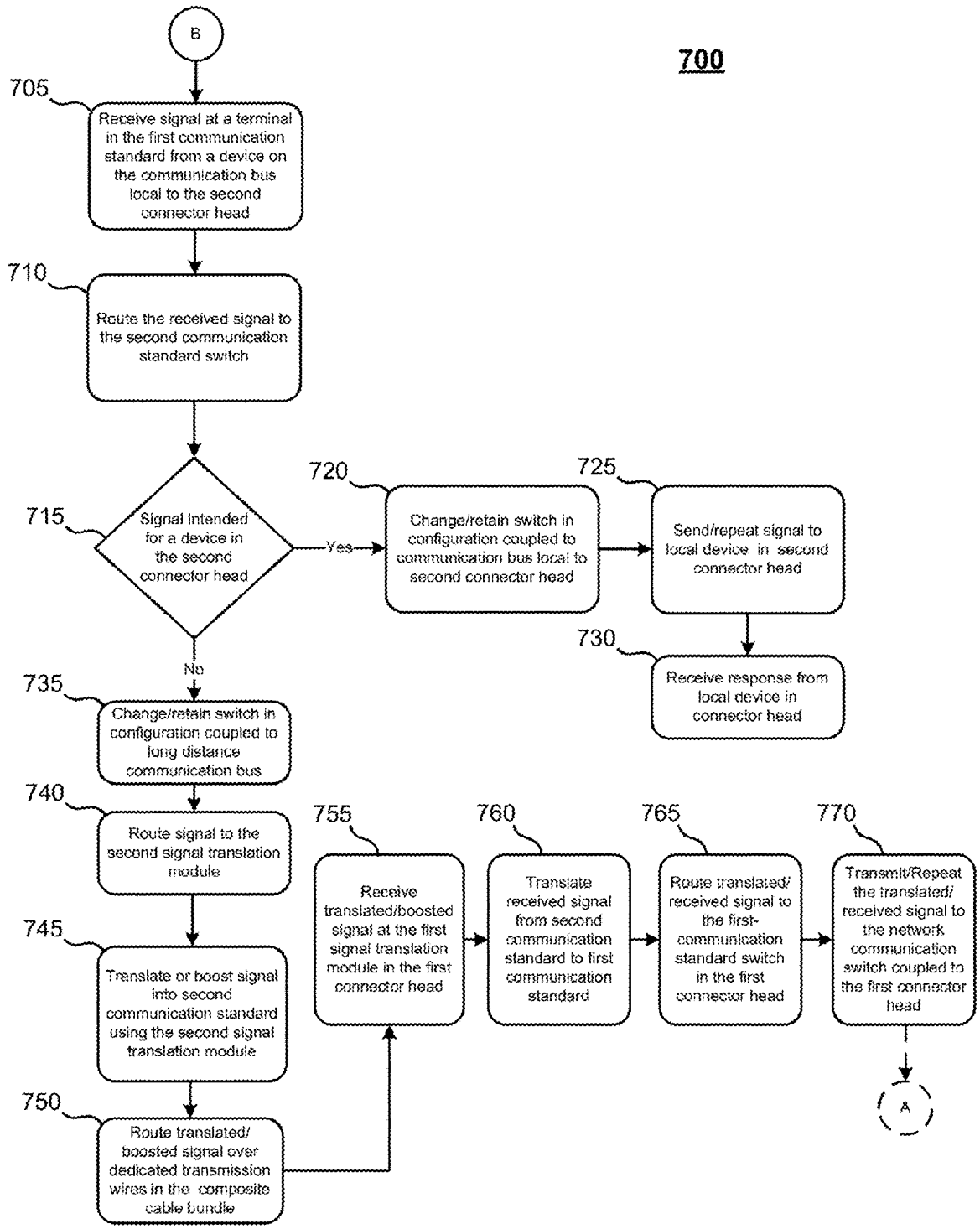
FIG. 7 is a flowchart of another method according to an embodiment of the present invention.

FIG. 7 is a flowchart of a method 700 according to one embodiment of the present invention for sending and receiving inter-integrated circuit communication signals from a server computer to which a cable bundle assembly, such as cable bundle assembly 200, is coupled. Method 700 can start at step "B," which can commence after the final action of method 600 of FIG. 6. In such embodiments, the server-end connector head can be used in conjunction with any properly configured network communication switch, the switch-end connector head, and the cable bundle assembly to communicate with inter-integrated circuit communication enabled components and devices on a communication bus local to the server-end connector head.

For example, in action 705, the server-end connector head can receive a signal at one or more terminals in a first communication standard from a device on the inter-integrated circuit communication bus. The first communication standard can include a short distance inter-integrated circuit communication protocol. The signal received by the server-end connector head can be received from a device, such as a memory or sensor, in the server-end connector head or in a server computer to which it is coupled.

In action 710 the received signal can then be routed via one or more connections, wires, or printed circuit board traces, to the server-end first communication standard switch. In some embodiments, the server-end first communication standard switch can include an I2C switch integrated circuit within the server-end connector head. As discussed herein, the server-end first communication standard switch can be configured to be in a default state, such that the communication bus internal and/or local to the server-end connector head is coupled to the signal translation module in the server-end connector head. In such embodiments, the server computer to which the server-end connector head is coupled can be programmed to send a signal to the first communication standard switch in the server-end connector head to connect the local bus that connects the server computer and the server-end connector head to an internal memory, such as an EEPROM, in the server-end connector head during startup, reboot, initialization, or other set up procedures. Once such startup, reboot, initialization, or other set up procedures are completed, the server computer to which the server-end connector head is coupled can be programmed to send a control signal to the first communication standard switch in the server-end connector head to set the first communication standard switch to a default state in which the first communication standard bus of the server computer is coupled to the translation module in the server-end connector head.

In action 715, the first communication standard switch, or other internal logic of the server-end connector head, can determine whether not a received signal from the server computer is intended for a device, such as a memory or sensor in the server-end connector head. Since it is possible for a memory, such as an EEPROM, in the switch-end connector head to be identical to a memory, such as another EEPROM, in the server-end connector head, configuring the first communication standard switch in the server-end connector head to be in a default state in which the memory in the server-end connector head is disconnected from the signal translation module in the server-end connector head avoids redundant device type specific or other manufacturer assigned addresses from being on the first communication standard bus at the same time. Such embodiments avoid data collisions and or other scenarios in which the system or network might get hung up or otherwise crash.

If in action 715, the first communication standard switch, or other logic, in the server-end connector head determines that the received signal is intended for a device in the server-end connector head, then the first communication standard switch in the server-end connector head can be configured to couple to the communication bus in the server-end connector head in action 720. In action 725, once the first communication standard switch in the server-end connector head is configured to couple the terminal on which the received signal was received with the internal bus to which devices, such as memories and sensors, inside the server-end connector head are connected, the received signal can be transmitted, forwarded, and/or repeated to one or more devices on the local communication bus within the server-end connector head in action 725. In the event that the received signal included a request for information from one of the devices, such as an EEPROM or environmental sensor, in the server-end connector head, the first communication standard switch in the server-end connector head can receive a response from local device in action 730. In such embodiments, the server computer to which the server-end connector head is coupled can request information from components and devices in the server-end connector head using an inter-integrated circuit communication protocol, such as I2C and its variants.

If, however, in action 715, the first communication standard switch, or other logic, in the server-end connector head determines that the received signal is intended for device not in the server-end connector head, then the first communication standard switch can be configured to couple the terminal or connection on which the signal was received to the long-distance communication bus that includes a signal translation module in the server-end connector head, in action 735.

In action 740, the received signal can be routed from the terminal or connection on which the signal was received via the first communication standard switch in the server-end connector head and any intervening connections, wires or traces, to the signal translation module in the server-end connector head.

In action 745, the signal translation module can translate and/or boost the received signal from the first communication standard into a second communication standard. In some instances, as discussed herein, translating the received signal from the short distance, low voltage, or low current communication standard signal, such as I2C, can include boosting the voltage or current of the signal and/or translating the received signal into entirely new communication protocol to avoid or reduce the amount of signal degradation or interference. Translating the first communication protocol into a second or boosted communication protocol can help increase the signal-to-noise ratio, thus reducing the chance for interference or the possibility of incorrectly interpreting a control signal.

In action 750, the translated and/or boosted signal can be routed or transmitted over one or more dedicated transmission wires in the cable bundle assembly. As previously discussed, using a dedicated local communication wires increases the security and robustness of the extended I2C communication bus and communication system between devices coupled to the switch-end connector head and the server-end connector head.

In action 755 the translated and/or boosted signal can be received at the signal translation module in the switch-end connector head. The translation module in the switch-end connector head can then translate the received boosted signal from the second communication standard back into the first communication standard, in action 760. For example, the received translated and/or boosted signal can include a boosted version of an I2C communication signal, such that translating the received boosted version of the I2C communication signal at the translation module in the switch-end connector head can include decreasing the voltage of the received signal back to a signal having voltages compatible with a native I2C communication signal.

In action 765, the now translated, or the down converted, received signal can be routed to the first communication protocol switch in the switch-end connector head. At 770, the signal can then be transmitted or repeated to the network communication switch coupled to the switch-end connector head via the dedicated communication wires in the cable bundle assembly. The method 700 described above can be used to receive responses from devices, such as environmental sensors, memories, and fans, coupled to the inter-integrated circuit communication bus within the server computer to which the server-end connector head is coupled. In some embodiments, the server computer or internal inter-integrated circuit communication enabled devices within the server computer can be configured or programmed to unilaterally initiate alert signals over the long distance inter-integrated circuit communication bus according to method 700 when a malfunction or exception is detected in the server computer.

Figure 8:
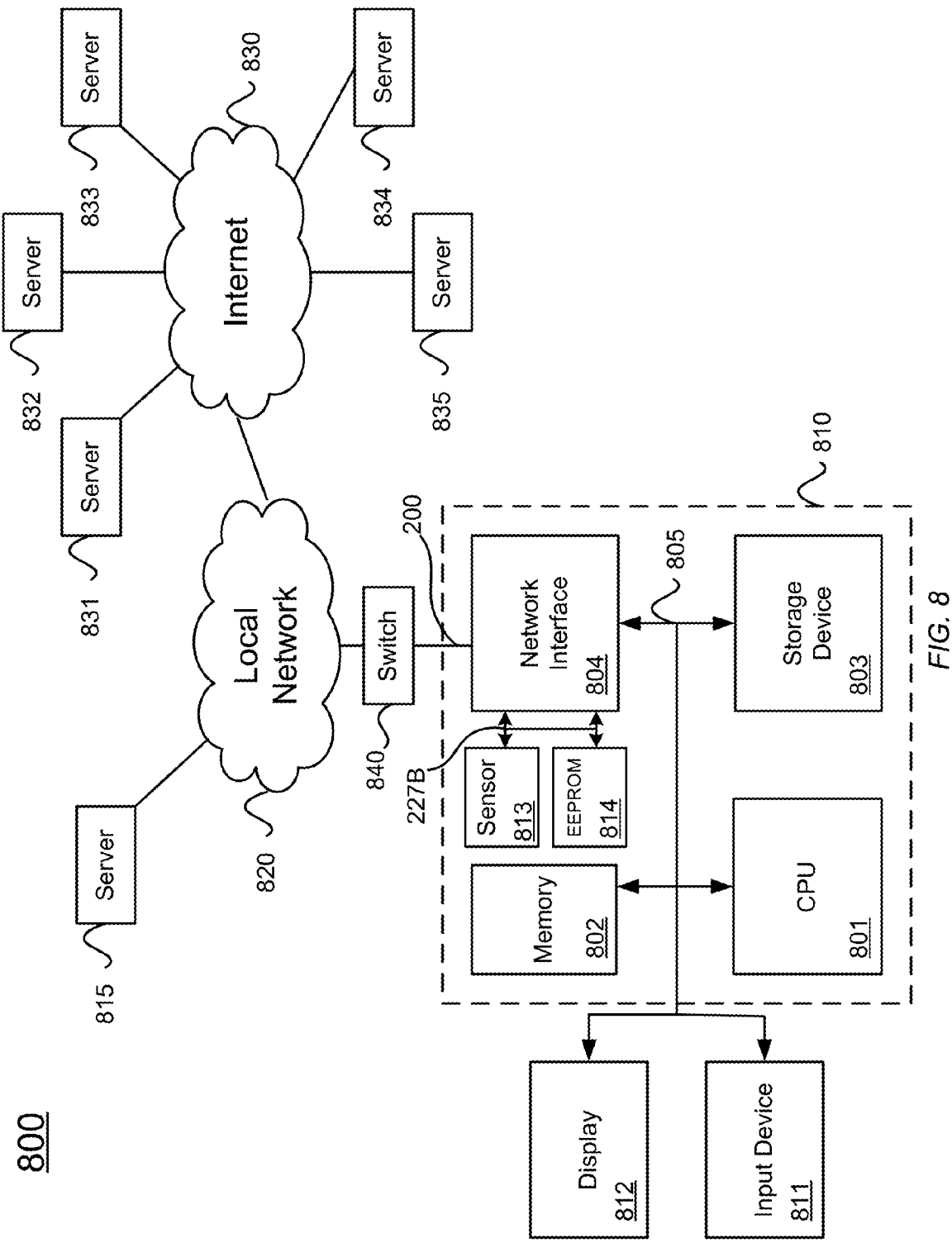
FIG. 8 is a simplified schematic of a network computer that can be improved by and be used to implement various embodiments of the present invention.

Exemplary computer system 810, switch 840, and local network 820 that can be used to implement and be improved by various embodiments of the present invention are illustrated in a system 800 in FIG. 8. Computer system 810 includes a bus 805 or other communication mechanism for communicating information, and a processor 801 coupled with bus 805 for processing information.

Computer system 810 also includes a memory 802 coupled to bus 805 for storing information and instructions to be executed by processor 801, including information and instructions for performing the techniques described above, for example. This memory may also be used for storing variables or other intermediate information during execution of instructions to be executed by processor 801. Possible implementations of this memory may be, but are not limited to, random access memory (RAM), read only memory (ROM), or both. In one exemplary embodiment, memory 802 can be loaded with to include instructions for initiation process that instructs CPU 801 to set an internal inter-integrated circuit communication protocol switch included in the connector head of composite network cable 200 to couple to and read from an EEPROM or other memory in the connector head during startup or initialization. Once the start-up or initialization procedure is completed by computer system 810, instructions loaded into memory 802 can further include instructions to set the internal inter-integrated circuit communication protocol switch to a default configuration such that the inter-integrated circuit communication wires within the composite network cable 200 are coupled to sensor 813 and EEPROM 814 within computer system 810 via the bus 227B connected to a terminal in the connector head. Such instructions can be stored in nonvolatile memory of storage device 803 can be loaded into memory 802 for execution by CPU 801 upon startup, reboot or other initialization procedures.

A storage device 803 can also be provided for storing other information and instructions. Common forms of storage devices include, for example, a hard drive, a magnetic disk, an optical disk, a CD-ROM, a DVD, a flash memory, a USB memory card, or any other medium from which a computer can read.

Storage device 803 may include source code, binary code, or software files for performing the techniques above, for example. Storage device and memory are both examples of computer readable media.

Computer system 810 may be coupled via bus 805 to a display 812, such as a cathode ray tube (CRT) or liquid crystal display (LCD), for displaying information to a computer user. An input device 811 such as an in-vehicle touch screen, is coupled to bus 805 for communicating information and command selections from the user to processor 801. The combination of these components allows the user to communicate with the system. In some systems, bus 805 may be divided into multiple specialized buses.

Computer system 810 also includes a network interface 804 coupled with bus 805. Network interface 804 may provide two-way data communication between computer system 810 the local network 820 via composite network cable 200 and switch 840. In some implementations, the network interface 804 may be for Broadband Wireless Access (BWA) technologies, while in other implementations network interface 840 can include network interface identification information or identifiers, such as a MAC address, that can be accessed by switch 840 using various embodiments the present invention over an inter-integrated circuit communication protocol. Similarly, switch 840 can also access bus 227B to communicate with, control, operates, read from, or otherwise interact with sensor 813 and EEPROM 814 of computer system 810. In any such implementation, network interface 804 sends and receives electrical, electromagnetic, or optical signals that carry digital data streams representing various types of information.

Computer system 810 can send and receive information, including messages or other interface actions, through the network interface 804 across a local network 820, an Intranet, or Internet 830, or the inter-integrated circuit communication protocol. For a local network, computer system 810 may communicate with a plurality of other computer machines, such as server 815, which may or may not be directly coupled to switch 840 in a rack type configuration. Accordingly, computer system 810 and server computer systems represented by server 815 may form a cloud computing network, which may be programmed with processes described herein.

In an example involving the Internet, software components or services may reside on multiple different computer systems 810 or servers 831-835 across the network. The processes described above may be implemented on one or more servers, for example. A server 831 may transmit actions or messages from one component, through Internet 830, local network 820, and network interface 804 to a component on computer system 810. The software components and processes described above may be implemented on any computer system and send and/or receive information across a network, for example.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents will be evident to those skilled in the art and may be employed without departing from the spirit and scope of the invention as defined by the claims.

What is claimed is:

1. An apparatus comprising:
a network cable;
a first connector head physically coupled to a first end of the network cable and attachable to a first connection point, the first connector head comprising:
a first signal switch comprising a plurality of ports and having a first port coupled to a first connector terminal configured to establish a first connection external to the network cable through the first connection point;
a first bus internal to the first connector head coupled to a second port of the first signal switch, the first bus coupled to a first device internal to the first connector head; and
a second bus internal to the first connector head coupled to a third port of the first signal switch;
a second connector head physically coupled to a second end of the network cable and attachable to a second connection point, the second connector head comprising:
a second signal switch comprising a plurality of ports and having a first port coupled to a second connector terminal configured to establish a second connection external to the network cable through the second connection point;
a third bus internal to the second connector head coupled to a second port of the second signal switch, the third bus coupled to a second device internal to the second connector head; and a fourth bus internal to the second connector head coupled to a third port of the second signal switch and coupled to the second bus internal to the first connector head via the network cable.

2. The network cable of claim 1 wherein the first connector terminal is configured to couple to a first interface external to the network cable and the second connector terminal is configured to couple to a second interface external to the network cable.

3. The network cable of claim 2 wherein the first interface external to the network cable is disposed in a network device and the second interface external to the network cable is disposed in a server computer.

4. The network cable of claim 1 wherein the first device comprises a memory.

5. The network cable of claim 1 further comprising one or more devices internal to the second connector head that are coupled to the fourth bus.

6. The network cable of claim 5 wherein the one or more devices internal to the second connector head that are coupled to the fourth bus comprise a sensor.

7. The network cable of claim 5 wherein the one or more devices internal to the second connector head that are coupled to the second bus comprise a signal translation module configured to generate a modified signal in response to a signal received via the fourth bus internal to the second connector head and send the modified signal via the network cable to the second bus internal to the first connector.

8. A method comprising:
receiving, from a first device external to a network cable through a first connection point, a command signal at a first terminal of a first connector head physically coupled to a first end of the network cable and attachable to the first connection point;
routing the command signal to a first port of a first switch internal to the first connector head; and
routing the command signal from the first switch to a first bus internal to the first connector head that is coupled to a second device internal to the first connector head or a second bus internal to the first connector head,
wherein the second bus internal to the first connector head is coupled to a third bus internal to a second connector head that is physically coupled to a second end of the network cable and attachable to a second connection point.

9. The method of claim 8 wherein routing the command signal comprises determining address information from the command signal.

10. The method of claim 9 wherein routing the command signal further comprises configuring the first switch internal to the first connector head to couple the first terminal of the first connector head to the first bus internal to the first connector head or the second bus internal to first connector in response to the address information.

11. The method of claim 8 wherein the second bus internal to the first connector head is coupled to the third bus internal to the second connector head via a translation module internal to the first connector head.

12. The method of claim 8 wherein receiving, from the first device external to the network cable, the command signal at the first terminal of the first connector head, comprises receiving the command signal from a first interface external to the network cable.

13. The method of claim 12 wherein the first device comprises a server computer or a network communication switch.

14. A system comprising:
a network cable;
a first connector head physically coupled to a first end of the network cable and attachable to a first connection point, the first connector head comprising:
a first signal switch comprising a plurality of ports and having a first port coupled to a first connector terminal configured to establish a first connection external to the network cable through the first connection point;
a first bus internal to the first connector head coupled to a second port of the first signal switch, the first bus coupled to a first device internal to the first connector head; and
a second bus internal to the first connector head coupled to a third port of the first signal switch;
a second connector head physically coupled to a second end of the network cable and attachable to a second connection point, the second connector head comprising:
a second signal switch comprising a plurality of ports and having a first port coupled to a second connector terminal configured to establish a second connection external to the network cable through the second connection point;
a third bus internal to the second connector head coupled to a second port of the second signal switch, the third bus coupled to a second device internal to the second connector head; and
a fourth bus internal to the second connector head coupled to a third port of the second signal switch and physically coupled to the second bus internal to the first connector head via the network cable;
a first network device coupled to the first connector head through the first connection point; and
a second network device coupled to the second connector head through the second connection point.

15. The system of claim 14 wherein the second bus internal to the first connector head is coupled to the fourth bus internal to the second connector head via the network cable and via a first translation module internal to the first connecter and a second translation module internal to the second connector head.

16. The system of claim 14 wherein the network cable comprises a communication connection coupled to the second bus internal to the first connector head and the fourth bus internal to the second connector head.

17. The system of claim 14 wherein the first device coupled to the second bus internal to the second connector head comprises a sensor.

18. A method comprising:
receiving, at a first connector terminal of a first connector head of a network cable through a first connection point, a command signal in a first communication protocol from an external device physically coupled to a first connector head that is attachable to the first connection point, the first connector head comprising a first internal switch coupled to each of the first connector terminal, a first bus internal to the first connector head that is coupled to a first internal device to the first connector head, and a second connector head of the network cable;
selectively routing the command signal in the first communication protocol from the first connector terminal to one of the first bus internal to the first connector head or the second connector head.

19. The method of claim 18 wherein routing the command signal to the second connector head comprises routing the command signal to a second bus internal to the first connector head coupled to a third bus internal to the second connector head via the network cable.

20. The method of claim 19 wherein routing the command signal to the third bus internal to the second connector head further comprises routing the command signal to a second internal device coupled to the third bus internal to the second connector head.

21. The method of claim 20 wherein the second internal device coupled to the third bus internal to the second connector head comprises a sensor.

22. The method of claim 21 wherein the sensor comprises a temperature or humidity sensor.

23. The method of claim 19 wherein routing the command signal to the third bus internal to the second connector head comprises:
- converting the command signal from the first communication protocol to a second communication protocol;
- sending the command signal in the second communication protocol to the second connector head via the network cable;
- receiving the command signal in the second communication protocol at the second connector head;
- converting the command signal from second communication protocol to the first communication protocol; and
- routing the command signal in the first communication protocol to a second internal device coupled to the third bus internal to the second connector head.

24. The method of claim 19 further comprising routing, in response to the command signal, a response signal from a second internal device coupled to the third bus internal to the second connector head to the first connector head via the network cable.

25. The method of claim 24 wherein the second internal device coupled to the third bus internal to the second connector head comprises an environmental sensor and the response signal comprises environmental data from the environmental sensor.

26. The method of claim 24 wherein routing the response signal to the first connector head further comprises:
- converting the response signal from the first communication protocol to the second communication protocol;
- sending the response signal in the second communication protocol to the first connector head via the network cable;
- receiving the response signal in the second communication protocol at the first connector head;
- converting the response signal from the second communication protocol to the first communication protocol; and
- routing the response signal in the first communication protocol to the external device via the first internal switch in the first connector head.

* * * * *

UNITED STATES PATENT AND TRADEMARK OFFICE
CERTIFICATE OF CORRECTION

PATENT NO.         : 8,848,699 B2
APPLICATION NO.    : 13/570080
DATED              : September 30, 2014
INVENTOR(S)        : Matthew Gambardella, Steven White and David Kaplin Page 1 of 1

It is certified that error appears in the above-identified patent and that said Letters Patent is hereby corrected as shown below:

IN THE CLAIMS:
In Column 19:
In line 5, replace "network cable" with --apparatus--.
In line 10, replace "network cable" with --apparatus--.
In line 14, replace "network cable" with --apparatus--.
In line 16, replace "network cable" with --apparatus--.
In line 19, replace "network cable" with --apparatus--.
In line 22, replace "network cable" with --apparatus--.

Signed and Sealed this
Twenty-eighth Day of April, 2015

Michelle K. Lee
*Director of the United States Patent and Trademark Office*